United States Patent
Parziale et al.

(10) Patent No.: US 11,790,735 B2
(45) Date of Patent: Oct. 17, 2023

(54) MODULAR DEVICE MESH NETWORK FOR ASSOCIATED DEVICE INTEGRATION

(71) Applicant: BANK OF AMERICA CORPORATION, Charlotte, NC (US)

(72) Inventors: Carl Parziale, Charlotte, NC (US); James Alexander, Dripping Springs, TX (US); Elizabeth Anne Price, Newport, TN (US); David Smiddy, Chadds Ford, PA (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 317 days.

(21) Appl. No.: 17/398,447

(22) Filed: Aug. 10, 2021

(65) Prior Publication Data

US 2023/0048988 A1 Feb. 16, 2023

(51) Int. Cl.
*G07F 19/00* (2006.01)
*H04L 9/40* (2022.01)
*G06F 21/31* (2013.01)

(52) U.S. Cl.
CPC ............ *G07F 19/203* (2013.01); *G06F 21/31* (2013.01); *H04L 63/0272* (2013.01); *H04L 63/108* (2013.01); *G06F 2221/2111* (2013.01)

(58) Field of Classification Search
CPC ...... G07F 19/203; G07F 19/211; G06F 21/31; G06F 2221/2111; H04L 63/0272; H04L 63/0838; H04L 63/108; G06Q 20/409
See application file for complete search history.

(56) References Cited

U.S. PATENT DOCUMENTS

| | | | |
|---|---|---|---|
| 7,654,450 B2 | 2/2010 | Mateen et al. |
| 8,282,001 B2 | 10/2012 | Snyder et al. |
| 8,316,237 B1 | 11/2012 | Felsher et al. |
| 8,640,946 B1 | 2/2014 | Block et al. |
| 8,955,743 B1 | 2/2015 | Block et al. |
| 8,971,932 B2 | 3/2015 | Mapes |
| 9,560,203 B2 | 1/2017 | Kay et al. |
| 9,607,483 B2 | 3/2017 | Block et al. |
| 9,679,278 B2 | 6/2017 | Drummond et al. |
| 9,767,422 B2 | 9/2017 | Ray et al. |
| 9,916,736 B2 | 3/2018 | Block et al. |
| 10,313,635 B2 | 6/2019 | Paliga et al. |
| 10,438,455 B2 | 10/2019 | Konecny et al. |
| 10,504,123 B2 | 12/2019 | Joao |
| 10,681,044 B1 | 6/2020 | Storm et al. |
| 11,188,637 B1 | 11/2021 | Lawson |
| 11,354,632 B1 | 6/2022 | Hill et al. |
| 11,374,976 B2 | 6/2022 | Lillie et al. |

(Continued)

*Primary Examiner* — Elda G Milef
(74) *Attorney, Agent, or Firm* — Moore & Van Allen PLLC; Nicholas C. Russell

(57) ABSTRACT

Embodiments of the present invention provide a system for facilitating a secure way to allow primary users and secondary users to perform interactions remotely via an automated machine and one or more auxiliary devices on the same local network. In particular, the system may assign exclusive control over an automated device and one or more auxiliary devices to a primary user via a computing device connected to the same local network or virtual private network as the automated machine, and may allow the primary user to communicate via the automated machine with a secondary user who wishes to complete one or more resource interactions.

20 Claims, 6 Drawing Sheets

(56) References Cited

U.S. PATENT DOCUMENTS

| | | |
|---|---|---|
| 2004/0164141 A1 | 8/2004 | Egami et al. |
| 2009/0201372 A1 | 8/2009 | O'Doherty et al. |
| 2013/0124411 A1* | 5/2013 | Kobres ............... G06Q 40/02 |
| | | 235/379 |
| 2016/0012411 A1 | 1/2016 | Kursun et al. |
| 2017/0140563 A1 | 5/2017 | No et al. |
| 2017/0178626 A1 | 6/2017 | Gruber et al. |
| 2019/0347632 A1 | 11/2019 | Lucas et al. |
| 2020/0005262 A1 | 1/2020 | Arora et al. |
| 2020/0137230 A1 | 4/2020 | Spohrer |
| 2021/0192484 A1 | 6/2021 | Forutanpour et al. |
| 2022/0351275 A1 | 11/2022 | Zhou et al. |
| 2022/0385656 A1 | 12/2022 | Gujarathi |

\* cited by examiner

MODULAR DEVICE MESH NETWORK FOR ASSOCIATED DEVICE INTEGRATION

BACKGROUND

There exists a need for an improved system that facilitates a secure way to allow primary users and authorized secondary users of an entity system to perform one or more interactions via automated machines.

BRIEF SUMMARY

The following presents a summary of certain embodiments of the invention. This summary is not intended to identify key or critical elements of all embodiments nor delineate the scope of any or all embodiments. Its sole purpose is to present certain concepts and elements of one or more embodiments in a summary form as a prelude to the more detailed description that follows.

Embodiments of the present invention address the above needs and/or achieve other advantages by providing apparatuses (e.g., a system, computer program product and/or other devices) and methods for facilitating a secure way to allow primary users and secondary users of an entity system to perform one or more interactions via automated machines. The system embodiments may comprise one or more memory devices having computer readable program code stored thereon, a communication device, and one or more processing devices operatively coupled to the one or more memory devices, wherein the one or more processing devices are configured to execute the computer readable program code to carry out the invention. In computer program product embodiments of the invention, the computer program product comprises at least one non-transitory computer readable medium comprising computer readable instructions for carrying out the invention. Computer implemented method embodiments of the invention may comprise providing a computing system comprising a computer processing device and a non-transitory computer readable medium, where the computer readable medium comprises configured computer program instruction code, such that when said instruction code is operated by said computer processing device, said computer processing device performs certain operations to carry out the invention.

In some embodiments, the present invention generally comprises the steps of receiving a one-time use code from a computing device of a secondary user; based on the one-time use code, identifying an automated machine, and based on the computing device of the secondary user, identifying the secondary user; locking a session between the automated machine and an entity application on a computing device of a primary user; identifying a local network of the computing device of the primary user and the automated machine, and locating one or more auxiliary devices on the local network; transmitting a list of operations of the one or more auxiliary devices to the primary user via the entity application; generating an audio and video session between the automated machine and the computing device of the primary user; and receiving an instruction set from the computing device of the primary user and triggering the automated machine and the one or more auxiliary devices to perform an interaction. In some embodiments, the interaction further comprises dispensing or generating one or more physical items such as cash, coins, or cashier's checks.

In some embodiments, locking the session between the automated machine and an entity application on a computing device of a primary user further comprises: identifying that the computing device of the primary user and the automated machine are connected to the same local network or VPN; and assigning control over the automated machine exclusively to the primary user during a set time period.

In some embodiments, the invention further comprises identifying the secondary user via correlating a geolocation of the computing device of the secondary user with a geolocation of the automated machine.

In some embodiments, the invention further comprises identifying the secondary user via an NFC communication between the automated machine and the computing device of the secondary user.

In some embodiments, the invention further comprises transmitting instructions to display a message on the automated machine directing the secondary user to a location of one of the one or more auxiliary user devices.

In some embodiments, the one or more auxiliary devices further comprise a coin dispensing machine or specialized check printer.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
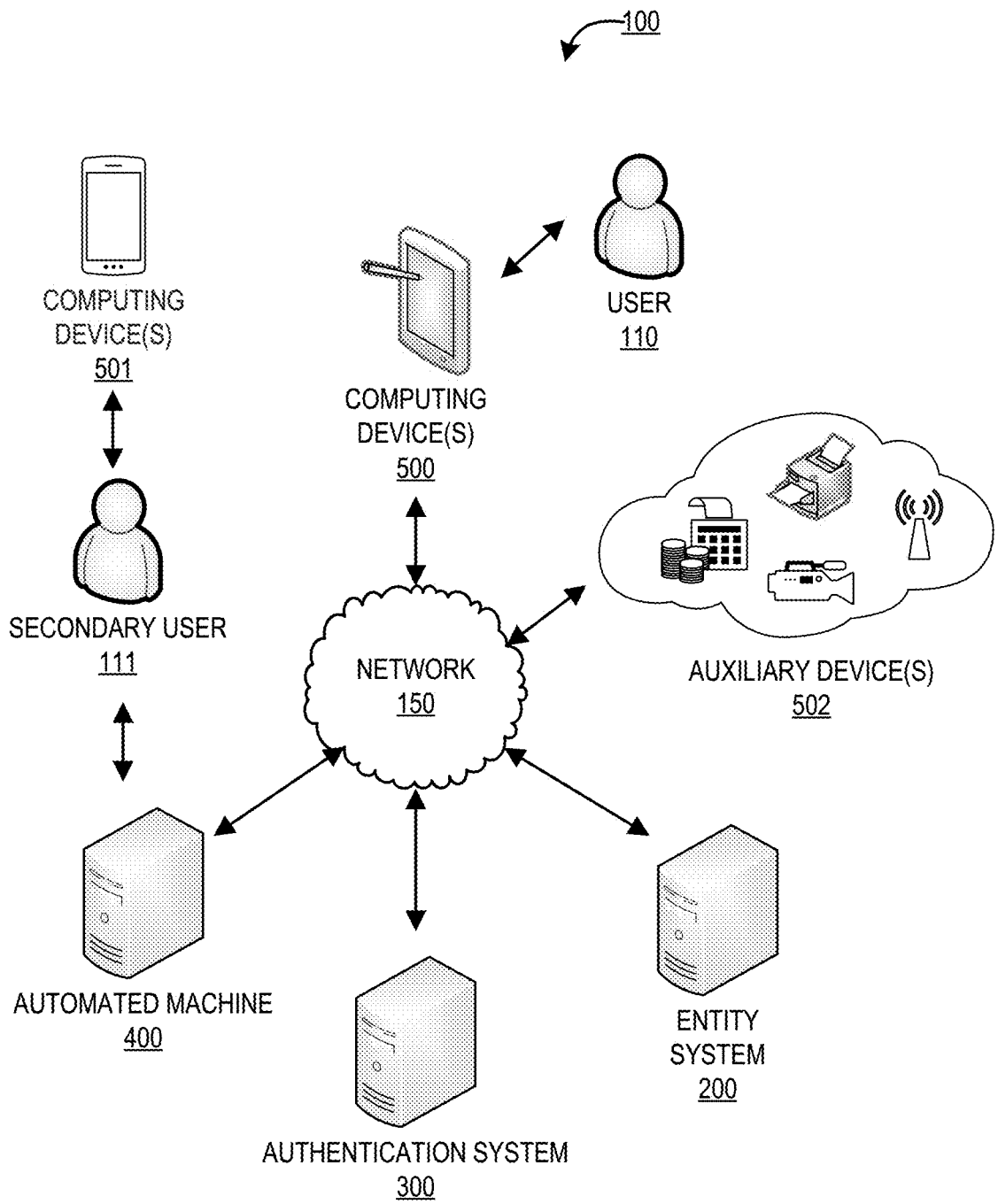
Figure 2:
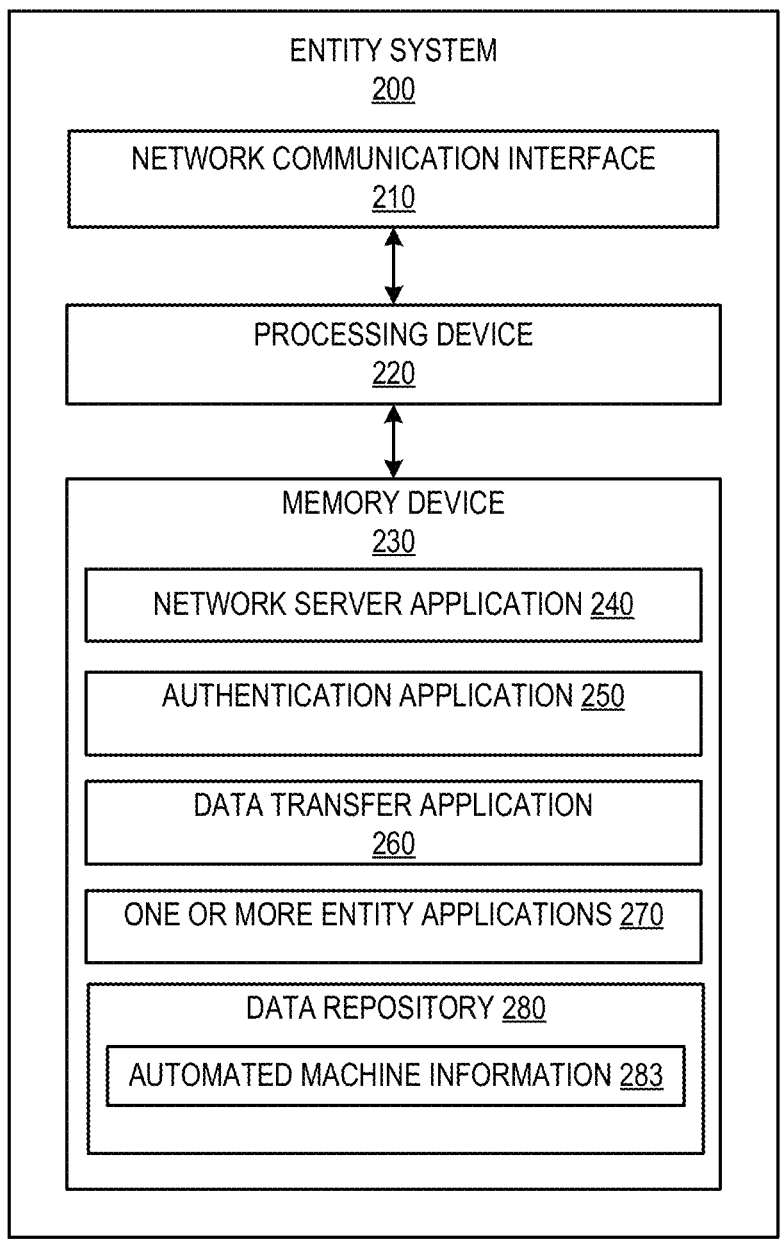
Figure 3:
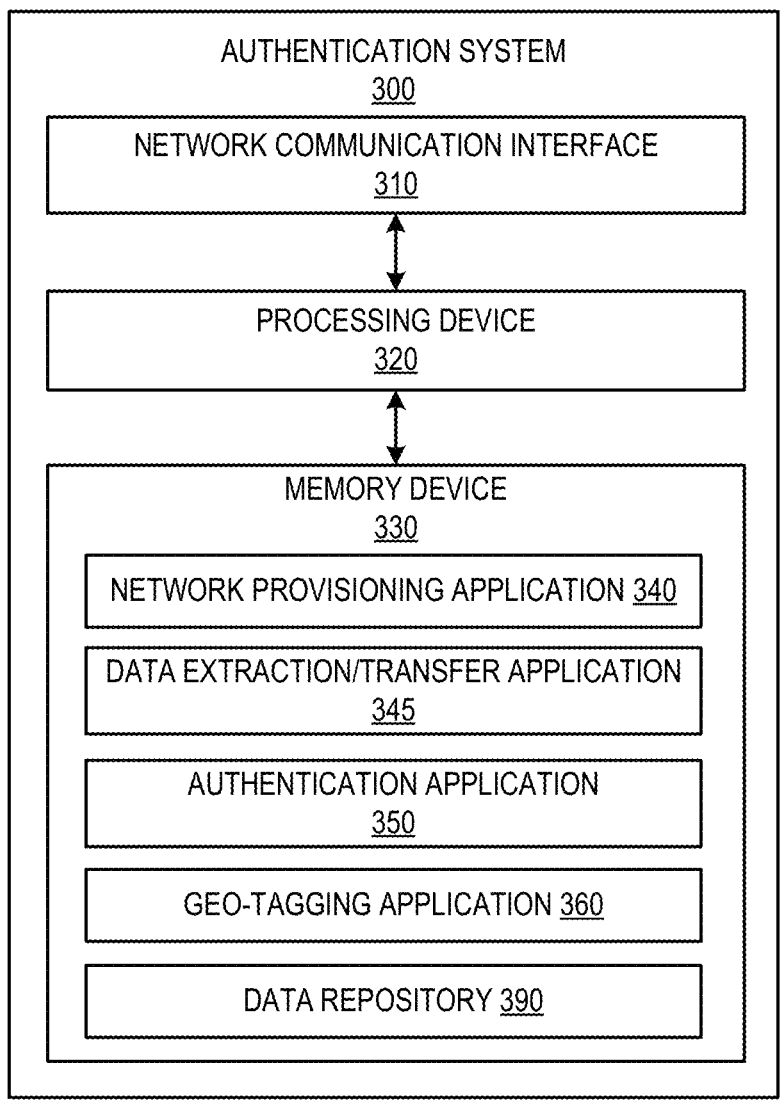
Figure 4:
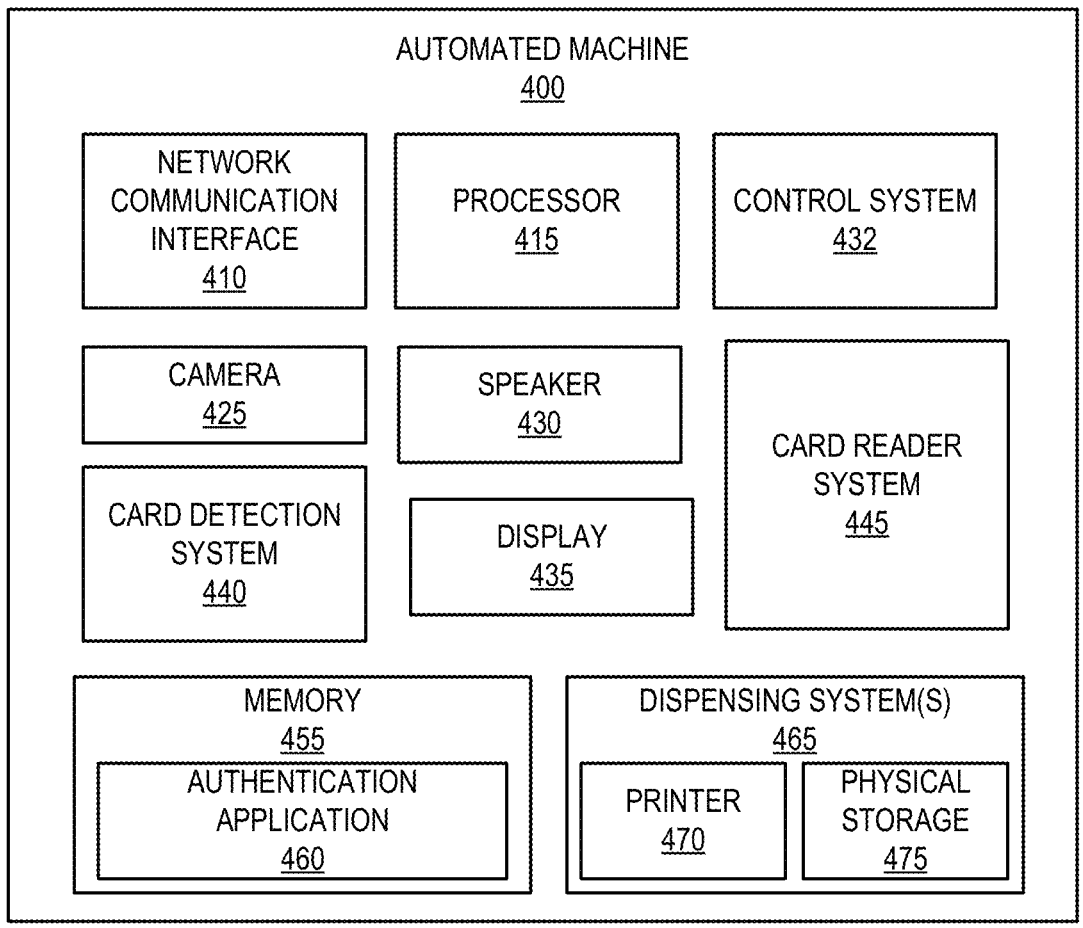
Figure 5:
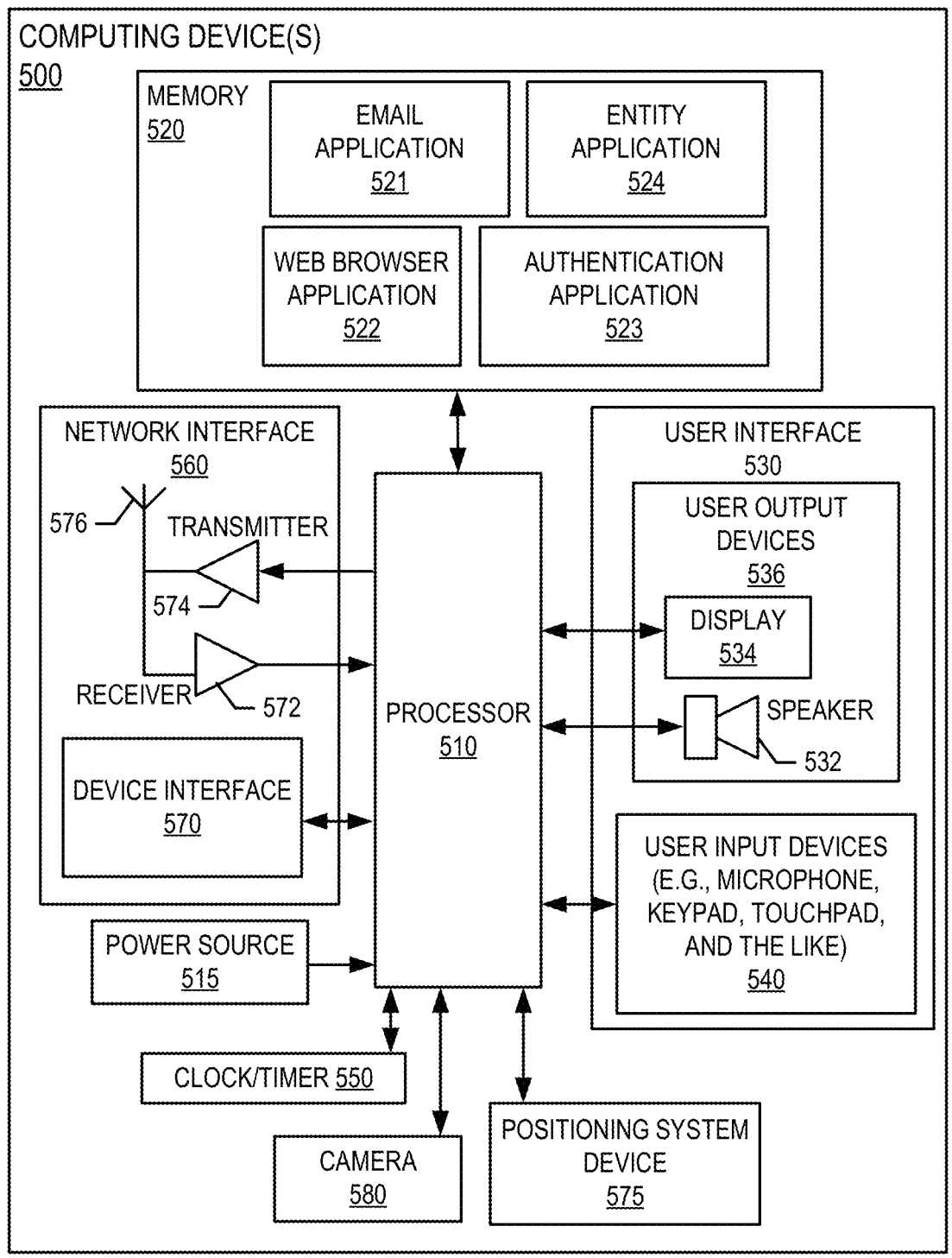
Figure 6:
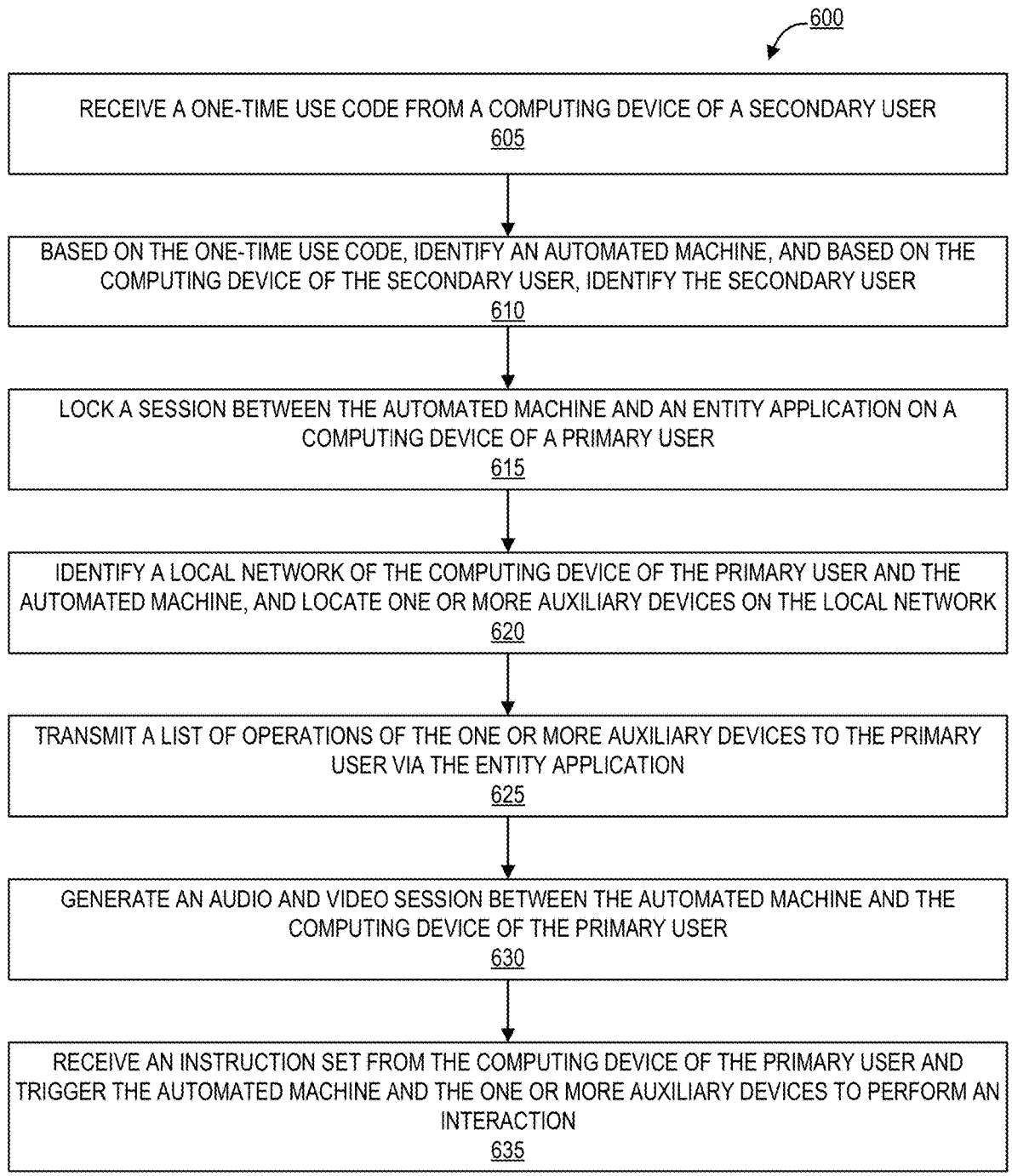

Having thus described embodiments of the invention in general terms, reference will now be made the accompanying drawings, wherein:

FIG. 1 provides a block diagram illustrating a system environment, in accordance with an embodiment of the invention;

FIG. 2 provides a block diagram illustrating an entity system 200 of FIG. 1, in accordance with an embodiment of the invention;

FIG. 3 provides a block diagram illustrating an authentication system 300 of FIG. 1, in accordance with an embodiment of the invention;

FIG. 4 provides a block diagram illustrating the components of an automated machine 400, in accordance with an embodiment of the present invention;

FIG. 5 provides a block diagram illustrations the components of computing device(s) 500 of FIG. 1, in accordance with an embodiment of the present invention; and FIG. 6 provides a block diagram illustrating a process flow secure remote connection between multiple entity devices and auxiliary devices for facilitation of interactions, in accordance with an embodiment of the invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

As used herein, the term "resource entity" or "entity" may be any institution which involves in financial transactions. In one embodiment, the term "entity" or "resource entity" may be any financial institution. As used herein, the term "entity device" may be any device associated with the entity. In some embodiments of the present invention, the entity device may be an automated machine. As used herein, the term "automated machine" may be any automated devices that are involved in distribution of resources such as cash, checks, cashier's checks, electronic transfers, money orders, or the like, which may be performed using a credit card, a debit card, contactless resource authentication method, or the like. In some embodiments of the present invention, the automated machine may be an Automated Teller Machine (ATM). In some embodiments, the automated machine may be owned and/or controlled by the resource entity.

As described herein, a "user" may be a customer or a potential customer of the entity. In some embodiments, a "user" may be a financial institution customer (e.g., an account holder or a person who has an account (e.g., banking account, credit account, or the like)). An "account" or "resource pool" may be the relationship that the customer has with the financial institution. Examples of accounts include a deposit account, such as a transactional account (e.g. a banking account), a savings account, an investment account, a money market account, a time deposit, a demand deposit, a pre-paid account, a credit account, a non-monetary customer information that includes only personal information associated with the customer, or the like. The account is associated with and/or maintained by a financial institution.

A "user interface" is any device or software that allows a user to input information, such as commands or data, into a device, or that allows the device to output information to the user. For example, the user interface includes a graphical user interface (GUI) or an interface to input computer-executable instructions that direct a processing device to carry out specific functions. The user interface typically employs certain input and output devices to input data received from a user or to output data to a user. These input and output devices may include a display, mouse, keyboard, button, touchpad, touch screen, microphone, speaker, LED, light, joystick, switch, buzzer, bell, and/or other user input/output device for communicating with one or more users. A user interface may be a graphical user interface that facilitates communication using one or more communication mediums such as tactile communication (such, as communication via a touch screen, keyboard, and the like), audio communication, textual communication and/or video communication (such as, gestures). Typically, a graphical user interface (GUI) of the present invention is a type of interface that allows users to interact with electronic elements/devices such as graphical icons and visual indicators such as secondary notation, as opposed to using only text via the command line. That said, the graphical user interfaces are typically configured for audio, visual and/or textual communication, and are configured to receive input and/or provide output using one or more user device components and/or external auxiliary/peripheral devices such as a display, a speaker, a microphone, a touch screen, a camera, or the like. In some embodiments, the graphical user interface may include both graphical elements and text elements. The graphical user interface is configured to be presented on one or more display devices associated with user devices, entity systems, auxiliary user devices, processing systems, or the like.

An electronic activity, also referred to as a "technology activity" or a "user activity", such as a "resource transfer" or "transaction", may refer to any activities or communication between a user or entity and the financial institution, between the user and the entity, activities or communication between multiple entities, communication between technology applications and the like. A resource transfer may refer to a payment, processing of funds, purchase of goods or services, a return of goods or services, a payment transaction, a credit transaction, or other interactions involving a user's resource or account. In the context of a financial institution or a resource entity such as a merchant, a resource transfer may refer to one or more of: transfer of resources/funds between financial accounts (also referred to as "resources"), deposit of resources/funds into a financial account or resource (for example, depositing a check), withdrawal of resources or finds from a financial account, a sale of goods and/or services, initiating an automated teller machine (ATM) or online banking session, an account balance inquiry, a rewards transfer, opening a bank application on a user's computer or mobile device, a user accessing their e-wallet, applying one or more promotions/coupons to purchases, or any other interaction involving the user and/or the user's device that invokes or that is detectable by or associated with the financial institution or resource entity.

In some embodiments, a resource transfer or transaction may refer to financial transactions involving direct or indirect movement of funds through traditional paper transaction processing systems (i.e. paper check processing) or through electronic transaction processing systems. In this regard, resource transfers or transactions may refer to the user initiating a funds/resource transfer between account, funds/resource transfer as a payment for the purchase for a product, service, or the like from a merchant, and the like. Typical financial transactions or resource transfers include point of sale (POS) transactions, automated teller machine (ATM) transactions, person-to-person (P2P) transfers, internet transactions, online shopping, electronic funds transfers between accounts, transactions with a financial institution teller, personal checks, conducting purchases using loyalty/rewards points etc. In some embodiments, a resource transfer or transaction may refer to non-financial activities of a user. In this regard, the transaction may be a customer account event, such as but not limited to a customer changing a password, ordering new products, adding new accounts, opening new accounts, adding or modifying account parameters/restrictions, modifying a payee list associated with one or more accounts, setting up automatic payments, performing/modifying authentication procedures, or the like.

Conventional systems require a primary user associated with a resource pool managed/maintained by the entity to be present at an entity device (e.g., an automated machine) to perform interactions (e.g., withdrawal of resources) with the entity device. In some instances, the primary user may not have the ability to be physically present at the entity device to perform the interaction and conventional systems do not allow a secondary user to perform the interaction on behalf of the primary user. Additionally, conventional systems also do not allow the primary users to perform contactless interactions with the entity device (i.e., the user is required to manually enter information onto the display of the entity device). As such, there exists a need for a system that overcomes these challenges to allow the primary user to perform contactless interaction and also to allow a secondary user to perform the interaction on behalf of the primary user. The system of the present invention solves the aforementioned problems by facilitating a secure way to allow primary users and secondary users to perform interactions with entity devices.

FIG. 1 provides a block diagram illustrating a system environment 100 for facilitating a secure way to allow primary users and secondary users of an entity system to perform one or more interactions on entity devices, in accordance with an embodiment of the invention. As illustrated in FIG. 1, the environment 100 includes an authentication system 300, one or more automated machines 400, one or more computing devices 500 used by user 110, and one or more computing devices 501 used by secondary user 120. In some embodiments, the environment 100 may include other entity devices that perform at least one or more actions as that of the one or more automated machines 400, such as one or more auxiliary device(s) 502.

As further depicted in FIG. 1, the automated machine 400, the authentication system 300, the entity system 200, the computing device(s) 500, and the auxiliary device(s) 502 are operatively coupled, via a network 150. In this way, the automated machine 400 can send information to and receive information from computing device(s) 500 and auxiliary devices 502 to provide an integrated platform for secure execution resource transactions and technology activities. The system creates a secure linkage via network 150 between the computing device 500 and the automated machine 400. The system generates a secure communication based on both the automated machine 400 and computing device 500 being on the same network 150. In some embodiments, the network 150 may include a virtual private network (VPN). In some embodiments, the automated machine 400 will only interact with specific designated computing device(s) 500. In some embodiments, each computing device 500 is located, from a networking perspective, within a firewall of the entity system 200, and each computing device 500 is required to confirm a one-time PIN in order to link the computing device 500 with the automated machine 400 to allow the automated machine 400 to complete instructions transmitted by the remote device. The system may also review multiple connectivity points to confirm the automated machine 400 and computing device 500 interaction, and these connectivity points may include proximity beacons, Bluetooth connections, near-field communication (NFC) connections, quick response (QR) code scanning, or the like, in order to further confirm automated machine 400 and computing device 500 linkage.

In other embodiments, the system links multiple components, such as the automated machine 400, and one or more auxiliary devices, such as a coin machine, printer, wireless beacon, camera, or the like, as represented in FIG. 1 by auxiliary devices 502. In some embodiments, these auxiliary devices are operatively connected and controlled within or across a financial institution by a single computing device 500. In some embodiments, the system creates a mesh network whereby a user interacting with the computing device 500 triggers the engagement of the necessary component on the mesh network (e.g., dispensing of a cashier's check via a specialized printer, dispensing of coins from a coin machine, activation of a specialized camera device for viewing one or more customers, or the like). As such, in some embodiments, instead of interaction with a single automated machine 400, the system may exclusively link one or more computing devices 500 to control one or more specialized auxiliary device(s) 502 via the computing device 500.

In some embodiments, the authentication system 300 may be a part of the entity system 200. In further embodiments, the authentication system 300 may be a remote and independent system which interacts with other systems in the system environment to perform one or more steps described herein. In some embodiments, the authentication system 300 and the one or more automated machines 400 may be owned by a resource entity which owns or manages the entity system 200. In some embodiments, access to the services of and the configurations for the automated machine 400 may be operated and/or controlled by the authentication system 300, and in some cases certain users may be given different permissions with regard to interacting with or controlling the automated machine 400. In some embodiments, the one or more automated machines 400 may be operated and/or controlled by the entity systems 200. In some embodiments, the one or more automated machines 400 may be operated and/or controlled by both the authentication system 300 and the entity system 200. In other embodiments, only a single computing device 500 may be operatively connected with the automated machine in order to configure or control one or more actions or interactive sessions with the automated machine 400. The entity system(s) 200 may be any system owned or otherwise controlled by the resource entity. The entity may be any entity which is involved in financial transactions. In some embodiments, the entity is a financial institution. The authentication system 300 and/or the automated machine 400 may communicate with entity system 200 to perform one or more steps described herein.

The authentication system 300, the entity system 200, the computing device 500, and/or the one or more automated machines 400 may be in network communication across the system environment 100 through the network 150. The network 150 may include a local area network (LAN), a wide area network (WAN), and/or a global area network (GAN). The network 150 may provide for wireline, wireless, or a combination of wireline and wireless communication between devices in the network. In one embodiment, the network 150 includes a virtual private network (VPN) tunnel over a larger network, such as the Internet, to ensure limited and secure communication between a select number of devices and components.

FIG. 2 provides a block diagram illustrating the entity system 200, in greater detail, in accordance with embodiments of the invention. As illustrated in FIG. 2, in one embodiment of the invention, the entity system 200 includes one or more processing devices 220 operatively coupled to a network communication interface 210 and a memory device 230. In certain embodiments, the entity system 200 is operated by a first entity, such as a financial institution, while in other embodiments, the entity system 200 is operated by an entity other than a financial institution.

It should be understood that the memory device 230 may include one or more databases or other data structures/repositories. The memory device 230 also includes computer-executable program code that instructs the processing device 220 to operate the network communication interface 210 to perform certain communication functions of the entity system 200 described herein. For example, in one embodiment of the entity system 200, the memory device 230 includes, but is not limited to, a network server application 240, an authentication application 250, a data transfer application 260, one or more entity applications 270, and a data repository 280 comprising automated machine information 283 (e.g., automated machine location, automated machine id, or the like). The automated machine information 283 may be any information associated with the one or more automated machines 400. The computer-executable program code of the network server application 240, the authentication application 250, the data transfer application 260, and the one or more entity applications 270 may instruct the processing device 220 to perform certain logic, data-extraction, and data-storing functions of the entity system 200 described herein, as well as communication functions of the entity system 200.

The network server application 240, the authentication application 250, the data transfer application 260, and the one or more entity applications 270 are configured to store data in the data repository 280 or to use the data stored in the data repository 280 when communicating through the network communication interface 210 with the authentication system 300 and the one or more automated machines 400 to perform one or more process steps described herein. In some embodiments, the entity system 200 may receive instructions from the authentication system 300 via the authentication application 250 to perform one or more operations.

FIG. 3 provides a block diagram illustrating the authentication system 300 in greater detail, in accordance with embodiments of the invention. As mentioned, the authentication system 300 of FIG. 1 is configured to perform the one or more functions described herein. As illustrated in FIG. 3, in one embodiment of the invention, the authentication system 300 includes one or more processing devices 320 operatively coupled to a network communication interface 310 and a memory device 330. In some embodiments, the authentication system 300 is operated by the resource entity, such as a financial institution. In some embodiments, the authentication system 300 may be an independent system. In alternate embodiments, the authentication system 300 may be a part of the entity system 200.

It should be understood that the memory device 330 may include one or more databases or other data structures/repositories. The memory device 330 also includes computer-executable program code that instructs the processing device 320 to operate the network communication interface 310 to perform certain communication functions of the authentication system 300 described herein. For example, in one embodiment of the authentication system 300, the memory device 330 includes, but is not limited to, a network provisioning application 340, a data extraction/transfer application 345, an authentication application 350, a geotagging application 360, and a data repository 390. In some embodiments, the memory device may also include a code generator (not shown) that generates one or more interaction specific codes that are to be displayed on the automated machine 400 and used for authenticating the primary and/or the secondary user. The computer-executable program code of the network provisioning application 340, the data extraction/transfer application 345, the authentication application 350, and the geotagging application 360 may instruct the processing device 320 to perform certain logic, data-processing, and data-storing functions of the authentication system 300 described herein, as well as communication functions of the authentication system 300.

In some embodiments, the network provisioning application 340, the data extraction/transfer application 345, the authentication application 350, and the geotagging application 360 may be a part of single application. The network provisioning application 340 may allow the authentication system 300 to communicate with the one or more automated machines 400, and entity system 200 to perform one or more operation disclosed in the process flow below.

FIG. 4 provides a block diagram illustrating the components of the automated machine 400, in accordance with an embodiment of the present invention. As illustrated in FIG. 4, in one embodiment of the invention, the automated machine 400 includes a processor 415 operatively coupled to a network communication interface 410, a memory component 455, a control system 432, a camera 425, a speaker 430, a display 435, a card detection system 440, a card reader system 445, and one or more secure item storage units 450. The card detection system 440 and the card reader system 445 may be mechanisms that aid the transactions performed at the automated machine. The automated machine 400 may include other components such as bar code scanner, item counter, and/or item tracker to perform multiple functions of the automated machine 400 as described in the process flow below. The one or more secure item storage units 450 may be any secure container (e.g., cassettes) that hold items such as cash bills, checks, or the like. Each of the one or more secure item storage units may be configured to receive and/or dispense certain items. For example, a first secure item storage unit may be configured to receive cash bills, a second secure item storage unit may be configured to received checks, and a third secure item storage unit may be configured to dispense cash bills.

It should be understood that the memory 455 may include one or more databases or other data structures/repositories. The memory 455 includes a authentication application 460 that comprises computer-executable program code that instructs the processor 415 to operate the network communication interface 410 to perform certain communication functions of the automated machine 400 described herein and also instructs the processor 415 to cause the control system 432 to perform certain actions of the automated machine 400 including, but not limited to, dispensing items, displaying messages on the display 435, tracking items, performing item count, or the like. In some embodiments, based on the instructions and control signals received from the authentication system 300 or the executable instructions present in the authentication application 460, the processor 415 via the control system 432 may operate the automated machine 400 such as displaying messages on the display 435, completing settlement process, or perform its certain other actions described herein.

As further illustrated in FIG. 4, the automated machine 400 may additionally include one or more dispensing system(s) 465. In some embodiments, dispensing system(s) 465 include physical dispensers for controlled production or presentation of physical resource instruments, such as cash, cashiers checks, money orders, coins, or the like. In some embodiments, the dispensing system(s) 465 may include a printer for production of customized resource instruments based on transmitted instructions or requests from the user 110 or secondary user 111. In such embodiments, physical storage 475 may include a repository of a particular number of blank checks, or the like, which may be fed to the printer 470 and catalogued in terms of the exact amount of checks, or the like, which are printed, or remain within the automated machine 400 at any given time. In other embodiments, the physical storage 475 may include a number of denominations of cash, coins, or the like, which may also be catalogued and in terms of the exact amount, denominations, or the like, which have been dispensed from, or remain in, the automated machine 400 at any given time.

FIG. 5 provides a block diagram illustrating the computing device(s) 500 of FIG. 1 in more detail, in accordance with embodiments of the invention. In preferred embodiments, the computing device 500 is a tablet computer. In further embodiments, the computing device 500 may be another mobile device, such as a laptop or mobile phone. However, it should be understood that a tablet, laptop, or phone are merely illustrative of a few variations of the computing device 500 that may benefit from, employ, or otherwise be involved with embodiments of the present invention and, therefore, should not be taken to limit the scope of embodiments of the present invention. It is understood that in preferred embodiments, computing device 501 will share the same or similar components as computing device 500, and in preferred embodiments the computing device 501 is a mobile phone, laptop, or the like, with a cellular communication or otherwise outside network connection apart from network 150. As such, the computing device 500 is designed to connect with, interface with, and control the automated machine 400 and interact with entity system 200, authentication system 300, and automated machine 400, as well as one or more auxiliary devices 502, via network 150, while the computing device 501 may be utilized by a secondary user 111 to initiate or request an interaction with the user 110 or automated machine 400, but not connect directly to the network 150. In some embodiments, the computing device 501 may interface directly with the automated machine 400 via a Bluetooth connection, NFC connection, or may identify the automated machine 400 via a QR code displayed on the automated machine 400, but the control of the automated machine 400 and its various components is generally strictly reserved to the computing device 500. In this way, the automated machine 400 and control over its various components is securely controlled to authorized users 110.

Some embodiments of the computing device 500 include a processor 510 communicably coupled to such devices as a memory 520, user output devices 536, user input devices 540, a network interface 560, a power source 515, a clock or other timer 550, a camera 580, and a positioning system device 575. The processor 510, and other processors described herein, generally include circuitry for implementing communication and/or logic functions of the computing device 500. For example, the processor 510 may include a digital signal processor device, a microprocessor device, and various analog to digital converters, digital to analog converters, and/or other support circuits. Control and signal processing functions of the computing device 500 are allocated between these devices according to their respective capabilities. The processor 510 thus may also include the functionality to encode and interleave messages and data prior to modulation and transmission. The processor 510 can additionally include an internal data modem. Further, the processor 510 may include functionality to operate one or more software programs, which may be stored in the memory 520. For example, the processor 510 may be capable of operating a connectivity program, such as a web browser application 522. The web browser application 522 may then allow the computing device 500 to transmit and receive web content, such as, for example, location-based content and/or other web page content, according to a Wireless Application Protocol (WAP), Hypertext Transfer Protocol (HTTP), and/or the like.

The processor 510 is configured to use the network interface 560 to communicate with one or more other devices on the network 150. In this regard, the network interface 560 includes an antenna 576 operatively coupled to a transmitter 574 and a receiver 572 (together a "transceiver"). The processor 510 is configured to provide signals to and receive signals from the transmitter 574 and receiver 572, respectively. The signals may include signaling information in accordance with the air interface standard of the applicable cellular system or Wi-Fi system of the network 150. In this regard, the computing device 500 may be configured to operate with one or more air interface standards, communication protocols, modulation types, and access types. By way of illustration, the computing device 500 may be configured to operate in accordance with any of a number of first, second, third, fourth, fifth, or sixth-generation communication protocols, or the like. Additionally, the computing device 500 may be enabled to interface with nearby devices, such as auxiliary devices 502 or automated machine 400 via a Thread network protocol. As such, the computing device 500 may generally be configured to operate in accordance with non-cellular communication mechanisms, such as via a wireless local area network (WLAN) or other communication/data networks, but may also be cellular-enabled for secure access to network 150 remotely as well.

As described above, the computing device 500 has a user interface that is, like other user interfaces described herein, made up of user output devices 536 and/or user input devices 540. The user output devices 536 include a display 530 (e.g., a liquid crystal display or the like) and a speaker 532 or other audio device, which are operatively coupled to the processor 510. The computing device 500 may also include a positioning system device 575 that is configured to be used by a positioning system to determine a location of the computing device 500. For example, the positioning system device 575 may include a GPS transceiver. In some embodiments, the positioning system device 575 is at least partially made up of the antenna 576, transmitter 574, and receiver 572 described above. For example, in one embodiment, triangulation of cellular signals may be used to identify the approximate or exact geographical location of the computing device 500. In other embodiments, the positioning system device 575 includes a proximity sensor or transmitter, such as an RFID tag, that can sense or be sensed by automated machines 400 or any other devices known to be located proximate a merchant or other location to determine that the computing device 500 is located proximate these known devices and/or automated machines 400.

The computing device 500 further includes a power source 515, such as a battery, for powering various circuits and other devices that are used to operate the computing device 500. Embodiments of the computing device 500 may also include a clock or other timer 550 configured to determine and, in some cases, communicate actual or relative time to the processor 510 or one or more other devices. The computing device 500 also includes a memory 520 operatively coupled to the processor 510. As used herein, memory includes any computer readable medium (as defined herein below) configured to store data, code, or other information. The memory 520 may include volatile memory, such as volatile Random Access Memory (RAM) including a cache area for the temporary storage of data. The memory 520 may also include non-volatile memory, which can be embedded and/or may be removable. The non-volatile memory can additionally or alternatively include an electrically erasable programmable read-only memory (EEPROM), flash memory or the like.

The memory 520 can store any of a number of applications which comprise computer-executable instructions/code executed by the processor 510 to implement the functions of the computing device 500 and/or one or more of the process/method steps described herein. For example, the memory 520 may include such applications as a conventional web browser application 522, an email application 521, an entity application 524, an authentication application 523, or the like. The email application 521, the web browser application 522, the authentication application 523 may allow the plurality of users 110 to communicate with the authentication system 300, the one or more automated machines 400, and/or the entity systems 200. The entity application 524 allows the one or more users 110 to interact with the plurality of entity systems 200. The authentication application 523 may be present in the memory 520 of the computing device 500 to allow direct communication with the authentication system 300 and also the one or more automated machines 400.

The memory 520 can also store any of a number of pieces of information, and data, used by the computing device 500 and the applications and devices that make up the computing device 500 or are in communication with the computing device 500 to implement the functions of the computing device 500 and/or the other systems described herein.

FIG. 6 provides a block diagram illustrating a process flow for remote device linkage and secure communication, in accordance with an embodiment of the invention. As shown in block 605, the process flow begins whereby the system receives a one-time use code from a computing device 501 of a secondary user 111. For instance, the system main periodically update one or more automated machine(s) 400 to display a one-time use code, and may catalogue which one-time use codes are currently displayed on particular automated machine(s) 400. In some embodiments, the one-time code may be a QR code. The secondary user 111 (e.g., customer, account holder, or the like), may approach the automated machine 400, scan the one-time use code displayed on the automated machine 400, and transmit the one-time code to the system via their computing device 501. Based on the one-time use code received, the system may identify the automated machine 400 that the user is in proximity to, and may also identify the secondary user 111 based on the computing device 501, or via an account or entity application session current active on the computing device 501 (e.g., via entity application 524, web browser application 522, or the like), as shown in block 610. In other embodiments, the system may identify the secondary user in proximity to the automated machine 400 via one or more methods such as geolocation of the computing device 501 (e.g., by comparing geolocation of the computing device 501 with the known location of the automated machine 400), or a short range communication between the automated machine 400 and the computing device 501 such as Bluetooth, NFC, or the like. The user identification associated with the secondary user may comprise at least one of phone number, user ID, full name, device ID, or the like associated with the secondary user.

The entity application (e.g., entity application 524) may also refer to an application provided by the entity that allows the secondary user to request one or more resource actions (e.g., checking resource pool balance, transferring resources, requesting a cashier's check, change order, or the like). In some embodiments, the secondary user may be log in to the entity application and select an option to conduct an interaction at the automated machine 400. After receiving selection of the option, the entity system 200 and/or the authentication system 300 may provide one or more locations of entity devices around the current location of the secondary user by retrieving the secondary user's location via the computing device 501. The one or more locations may be associated with the geotagging of the automated machine(s) 400 performed by the system of the present invention. In response to displaying the one or more locations, the secondary user may select at least one automated machine associated with a location of the one or more locations.

As shown in block 615, the system establishes a link with the automated machine and the computing device 500 of the primary user (such as user 110). In preferred embodiments, the automated machine 400 may only be controlled to dispense items or complete interactions via instructions received from computing device(s) 500 over network 150, and as such the system "locks" a session between the automated machine 400 and an entity application on the computing device 500 of the primary user. After establishing the connection, the system locks a session between the automated machine and the entity application located on the computing device 500 of the primary user. The session may be an application session between computing device 500 of the primary user and the automated machine 400.

At this stage, the system also identifies a local network of the computing device 500 of the primary user 110 and the automated machine 400, and locates one or more auxiliary devices on the local network, as shown in block 620. The system may then transmit a list of operations of the one or more auxiliary devices to the primary user via the entity application of the computing device 500, as shown in block 625. For example, the system may display a list of possible operations that the primary user may initiate for the secondary user at a certain location (e.g., some locations may have devices for printing specialized checks, dispensing certain denominations, or the like, and these auxiliary devices and their available operations may differ from location to location, or may differ based on the current physical dispensing capacity of the auxiliary devices themselves). In some instances, the system instead identifies a VPN as opposed to a local network, and may locate auxiliary devices in geographic proximity to the automated machine 400 (e.g., devices located at the same branch location, or the like, as the automated machine 400).

In response to locking the session, the system may allow the primary user to communicate with the secondary user 111 via the automated machine 400 and control the actions of its various components, as shown in block 630, which states that the system may generate an audio and video session between the automated machine 400 and the computing device 500 of the primary user. As shown in block 635, at the conclusion of the communication, the primary user may transmit a set of instructions to the system, and the system may transmit the set of instructions to the automated machine 400, wherein the set of instructions cause the automated machine to complete an interaction (e.g., dispensing resources, or the like). In some embodiments, the set of instructions may invoke one or more auxiliary devices 502. For instance, the automated machine 400 may not contain all the necessary components, dispensing systems 465, or the like in order to complete the interaction in full. In this instance, the system will automatically invoke one or more auxiliary devices 502 connected to network 150 in order to complete the interaction (e.g., via a separate printer, coin machine, or the like), and may direct the secondary user to the correct location to retrieve dispensed items (e.g., the system may display a message on the automated machine 400 such as "please see associate inside branch for dispensed cashier's check" or "please drive to branch window in lane 1," or the like).

As will be appreciated by one of skill in the art, the present invention may be embodied as a method (including, for example, a computer-implemented process, a business process, and/or any other process), apparatus (including, for example, a system, machine, device, computer program product, and/or the like), or a combination of the foregoing. Accordingly, embodiments of the present invention may take the form of an entirely hardware embodiment, an entirely software embodiment (including firmware, resident software, micro-code, and the like), or an embodiment combining software and hardware aspects that may generally be referred to herein as a "system." Furthermore, embodiments of the present invention may take the form of a computer program product on a computer-readable medium having computer-executable program code embodied in the medium.

Any suitable transitory or non-transitory computer readable medium may be utilized. The computer readable medium may be, for example but not limited to, an electronic, magnetic, optical, electromagnetic, infrared, or semiconductor system, apparatus, or device. More specific examples of the computer readable medium include, but are not limited to, the following: an electrical connection having one or more wires; a tangible storage medium such as a portable computer diskette, a hard disk, a random access memory (RAM), a read-only memory (ROM), an erasable programmable read-only memory (EPROM or Flash memory), a compact disc read-only memory (CD-ROM), or other optical or magnetic storage device.

In the context of this document, a computer readable medium may be any medium that can contain, store, communicate, or transport the program for use by or in connection with the instruction execution system, apparatus, or device. The computer usable program code may be transmitted using any appropriate medium, including but not limited to the Internet, wireline, optical fiber cable, radio frequency (RF) signals, or other mediums.

Computer-executable program code for carrying out operations of embodiments of the present invention may be written in an object oriented, scripted or unscripted programming language such as Java, Perl, Smalltalk, C++, or the like. However, the computer program code for carrying out operations of embodiments of the present invention may also be written in conventional procedural programming languages, such as the "C" programming language or similar programming languages.

Embodiments of the present invention are described above with reference to flowchart illustrations and/or block diagrams of methods, apparatus (systems), and computer program products. It will be understood that each block of the flowchart illustrations and/or block diagrams, and/or combinations of blocks in the flowchart illustrations and/or block diagrams, can be implemented by computer-executable program code portions. These computer-executable program code portions may be provided to a processor of a general purpose computer, special purpose computer, or other programmable data processing apparatus to produce a particular machine, such that the code portions, which execute via the processor of the computer or other programmable data processing apparatus, create mechanisms for implementing the functions/acts specified in the flowchart and/or block diagram block or blocks.

These computer-executable program code portions may also be stored in a computer-readable memory that can direct a computer or other programmable data processing apparatus to function in a particular manner, such that the code portions stored in the computer readable memory produce an article of manufacture including instruction mechanisms which implement the function/act specified in the flowchart and/or block diagram block(s).

The computer-executable program code may also be loaded onto a computer or other programmable data processing apparatus to cause a series of operational steps to be performed on the computer or other programmable apparatus to produce a computer-implemented process such that the code portions which execute on the computer or other programmable apparatus provide steps for implementing the functions/acts specified in the flowchart and/or block diagram block(s). Alternatively, computer program implemented steps or acts may be combined with operator or human implemented steps or acts in order to carry out an embodiment of the invention.

As the phrase is used herein, a processor may be "configured to" perform a certain function in a variety of ways, including, for example, by having one or more general-purpose circuits perform the function by executing particular computer-executable program code embodied in computer-readable medium, and/or by having one or more application-specific circuits perform the function.

Embodiments of the present invention are described above with reference to flowcharts and/or block diagrams. It will be understood that steps of the processes described herein may be performed in orders different than those illustrated in the flowcharts. In other words, the processes represented by the blocks of a flowchart may, in some embodiments, be in performed in an order other that the order illustrated, may be combined or divided, or may be performed simultaneously. It will also be understood that the blocks of the block diagrams illustrated, in some embodiments, merely conceptual delineations between systems and one or more of the systems illustrated by a block in the block diagrams may be combined or share hardware and/or software with another one or more of the systems illustrated by a block in the block diagrams. Likewise, a device, system, apparatus, and/or the like may be made up of one or more devices, systems, apparatuses, and/or the like. For example, where a processor is illustrated or described herein, the processor may be made up of a plurality of microprocessors or other processing devices which may or may not be coupled to one another. Likewise, where a memory is illustrated or described herein, the memory may be made up of a plurality of memory devices which may or may not be coupled to one another.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

INCORPORATION BY REFERENCE

To supplement the present disclosure, this application further incorporates entirely by reference the following commonly assigned patent applications:

| Docket Number | U.S. patent application Ser. No. | Title | Filed On |
|---|---|---|---|
| 12532US1.014033.4084 | To be assigned | SYSTEM AND METHOD FOR TRANSFORMING ENTITY DEVICE TO A MULTIFUNCTIONAL DEVICE VIA A REMOTE COMMUNICATION LINK | Concurrently herewith |
| 12533US1.014033.4085 | To be assigned | REMOTE DEVICE LINKAGE FOR SECURE COMMUNICATIONS | Concurrently herewith |

What is claimed is:

1. A system for secure remote connection between multiple entity devices and auxiliary devices for facilitation of interactions, the system comprising:
   a memory device with computer-readable program code stored thereon;
   a communication device; and
   a processing device operatively coupled to the memory device and the communication device, wherein the processing device is configured to execute the computer-readable program code to:
   receive a one-time use code from a computing device of a secondary user;
   based on the one-time use code, identify an automated machine, and based on the computing device of the secondary user, identify the secondary user;
   lock a session between the automated machine and an entity application on a computing device of a primary user;
   identify a local network of the computing device of the primary user and the automated machine, and locate one or more auxiliary devices on the local network;
   transmit a list of operations of the one or more auxiliary devices to the primary user via the entity application;
   generate an audio and video session between the automated machine and the computing device of the primary user; and
   receive an instruction set from the computing device of the primary user and trigger the automated machine and the one or more auxiliary devices to perform an interaction.

2. The system according to claim 1, wherein the interaction further comprises dispensing or generating one or more physical items such as cash, coins, or cashier's checks.

3. The system according to claim 1, wherein locking the session between the automated machine and an entity application on a computing device of a primary user further comprises:
   identifying that the computing device of the primary user and the automated machine are connected to the same local network or VPN; and
   assigning control over the automated machine and the one or more auxiliary devices exclusively to the primary user during a set time period.

4. The system according to claim 1, wherein the system is further configured to identify the secondary user via correlating a geolocation of the computing device of the secondary user with a geolocation of the automated machine.

5. The system according to claim 1, wherein the system is further configured to identify the secondary user via an NFC communication between the automated machine and the computing device of the secondary user.

6. The system according to claim 1, further comprising transmitting instructions to display a message on the automated machine directing the secondary user to a location of one of the one or more auxiliary user devices.

7. The system according to claim 1, wherein the one or more auxiliary devices further comprise a coin dispensing machine or specialized check printer.

8. A computer program product for secure remote connection between multiple entity devices and auxiliary devices for facilitation of interactions, the computer program product comprising at least one non-transitory computer readable medium having computer-readable program code portions embodied therein, the computer-readable program code portions comprising executable portions for:
   receiving a one-time use code from a computing device of a secondary user;
   based on the one-time use code, identifying an automated machine, and based on the computing device of the secondary user, identifying the secondary user;
   locking a session between the automated machine and an entity application on a computing device of a primary user;
   identifying a local network of the computing device of the primary user and the automated machine, and locating one or more auxiliary devices on the local network;
   transmitting a list of operations of the one or more auxiliary devices to the primary user via the entity application;
   generating an audio and video session between the automated machine and the computing device of the primary user; and
   receiving an instruction set from the computing device of the primary user and triggering the automated machine and the one or more auxiliary devices to perform an interaction.

9. The computer program product of claim 8, wherein the interaction further comprises dispensing or generating one or more physical items such as cash, coins, or cashier's checks.

10. The computer program product of claim 8, wherein locking the session between the automated machine and an entity application on a computing device of a primary user further comprises:
    identifying that the computing device of the primary user and the automated machine are connected to the same local network or VPN; and
    assigning control over the automated machine exclusively to the primary user during a set time period.

11. The computer program product of claim 8, the computer-readable program code portions further comprising executable portions for identifying the secondary user via correlating a geolocation of the computing device of the secondary user with a geolocation of the automated machine.

12. The computer program product of claim 8, the computer-readable program code portions further comprising executable portions for identifying the secondary user via an NFC communication between the automated machine and the computing device of the secondary user.

13. The computer program product of claim 8, further comprising transmitting instructions to display a message on the automated machine directing the secondary user to a location of one of the one or more auxiliary user devices.

14. A computer-implemented method for secure remote connection between multiple entity devices and auxiliary devices for facilitation of interactions, the method comprising:

receiving a one-time use code from a computing device of a secondary user;

based on the one-time use code, identifying an automated machine, and based on the computing device of the secondary user, identifying the secondary user;

locking a session between the automated machine and an entity application on a computing device of a primary user;

identifying a local network of the computing device of the primary user and the automated machine, and locating one or more auxiliary devices on the local network;

transmitting a list of operations of the one or more auxiliary devices to the primary user via the entity application;

generating an audio and video session between the automated machine and the computing device of the primary user; and receiving an instruction set from the computing device of the primary user and triggering the automated machine and the one or more auxiliary devices to perform an interaction.

15. The computer-implemented method of claim 14, wherein the interaction further comprises dispensing or generating one or more physical items such as cash, coins, or cashier's checks.

16. The computer-implemented method of claim 14, wherein locking the session between the automated machine and an entity application on a computing device of a primary user further comprises:

identifying that the computing device of the primary user and the automated machine are connected to the same local network or VPN; and assigning control over the automated machine exclusively to the primary user during a set time period.

17. The computer-implemented method of claim 14, further comprising identifying the secondary user via correlating a geolocation of the computing device of the secondary user with a geolocation of the automated machine.

18. The computer-implemented method of claim 14, further comprising identifying the secondary user via an NFC communication between the automated machine and the computing device of the secondary user.

19. The computer-implemented method of claim 14, further comprising transmitting instructions to display a message on the automated machine directing the secondary user to a location of one of the one or more auxiliary user devices.

20. The computer-implemented method of claim 14, wherein the one or more auxiliary devices further comprise a coin dispensing machine or specialized check printer.

* * * * *